United States Patent
Stasiewicz et al.

(10) Patent No.: US 7,889,461 B2
(45) Date of Patent: Feb. 15, 2011

(54) INTERNAL SUPPORT INTERFACE BETWEEN A SHAFT AND HOUSING MEMBER WITH VIBRATION AND ACOUSTIC ISOLATION

(75) Inventors: Paul Stasiewicz, Arvada, CO (US); Rick Tufty, Loveland, CO (US); Gary Holland, Westminster, CO (US)

(73) Assignee: Maxtor Corporation, Scotts Valley, CA (US)

( * ) Notice: Subject to any disclaimer, the term of this patent is extended or adjusted under 35 U.S.C. 154(b) by 949 days.

(21) Appl. No.: 11/747,740

(22) Filed: May 11, 2007

(65) Prior Publication Data

US 2007/0291407 A1 Dec. 20, 2007

Related U.S. Application Data

(60) Provisional application No. 60/747,056, filed on May 11, 2006.

(51) Int. Cl.
  *G11B 5/55* (2006.01)
(52) U.S. Cl. .................... 360/265.6; 360/265.2
(58) Field of Classification Search ............. 360/264.1, 360/265.2–265.6
See application file for complete search history.

(56) References Cited

U.S. PATENT DOCUMENTS

| | | | |
|---|---|---|---|
| 4,491,888 A | 1/1985 | Brown et al. | |
| 5,097,164 A | 3/1992 | Nakasugi et al. | |
| 5,875,067 A | 2/1999 | Morris et al. | |
| 6,377,420 B1 | 4/2002 | Tadepalli et al. | |
| 6,407,879 B1 | 6/2002 | Fruge'et al. | |
| 6,501,614 B1 | 12/2002 | Kang et al. | |
| 6,501,615 B1 * | 12/2002 | Kelsic et al. | 360/97.02 |
| 6,510,021 B1 | 1/2003 | Woldemar et al. | |
| 6,801,386 B1 * | 10/2004 | Niroot et al. | 360/97.01 |
| 6,930,858 B2 | 8/2005 | Gunderson et al. | |
| 7,251,100 B1 * | 7/2007 | Frees et al. | 360/99.08 |

* cited by examiner

*Primary Examiner*—A. J. Heinz
(74) *Attorney, Agent, or Firm*—Fellers, Snider, et al.

(57) ABSTRACT

An internal support interface which provides vibration and acoustic isolation. A stationary shaft has a medial portion about which a rotatable member rotates. An end portion of the shaft has an annular base surface surrounding a stub shaft projection. A substantially planar housing member has a support post which extends from an annular interior surface in adjacent, non-contacting proximity to the stub shaft projection to form a gap therebetween. An annular damping member mutually contactingly surrounds the stub shaft projection and the support post while being compressed between the base surface of the shaft and the interior surface of the housing member.

19 Claims, 3 Drawing Sheets

INTERNAL SUPPORT INTERFACE BETWEEN A SHAFT AND HOUSING MEMBER WITH VIBRATION AND ACOUSTIC ISOLATION

RELATED APPLICATIONS

The present application makes a claim of domestic priority to U.S. Provisional Patent Application No. 60/747,056 filed May 11, 2006.

BACKGROUND

Data storage devices are used in a variety of applications to store and retrieve user data. The data are often stored to internal storage media provisioned within a data storage device housing. The housing may be sealed to isolate the media from contamination and other effects from an exterior atmosphere.

The storage media can take a variety of forms, such as one or more rotatable discs accessed by an array of data transducers supported by a moveable actuator. These moveable components are often rigidly supported by the housing, which can result in the transmission of vibrations to the housing and the generation of undesired acoustic noise during operation.

Some device designs further utilize a low density internal atmosphere within the housing, such as an Inert gas (e.g., helium). This can provide certain operational performance advantages for the device, such as lower transducer fly heights, reduced non-repeatable runout (NRRO) effects, and higher data recording densities.

SUMMARY

Various embodiments of the present invention are generally directed to an internal support interface which provides vibration and acoustic isolation for an operational environment such as, but not limited to, a data storage device.

In accordance with various embodiments, a stationary shaft has a medial portion about which a rotatable member rotates. An end portion of the shaft has an annular base surface surrounding a stub shaft projection. A substantially planar housing member has a support post which extends from an annular interior surface in adjacent, non-contacting proximity to the stub shaft projection to form a gap therebetween. An annular damping member mutually contactingly surrounds the stub shaft projection and the support post while being compressed between the base surface of the shaft and the interior surface of the housing member.

DETAILED DESCRIPTION

Figure 1:
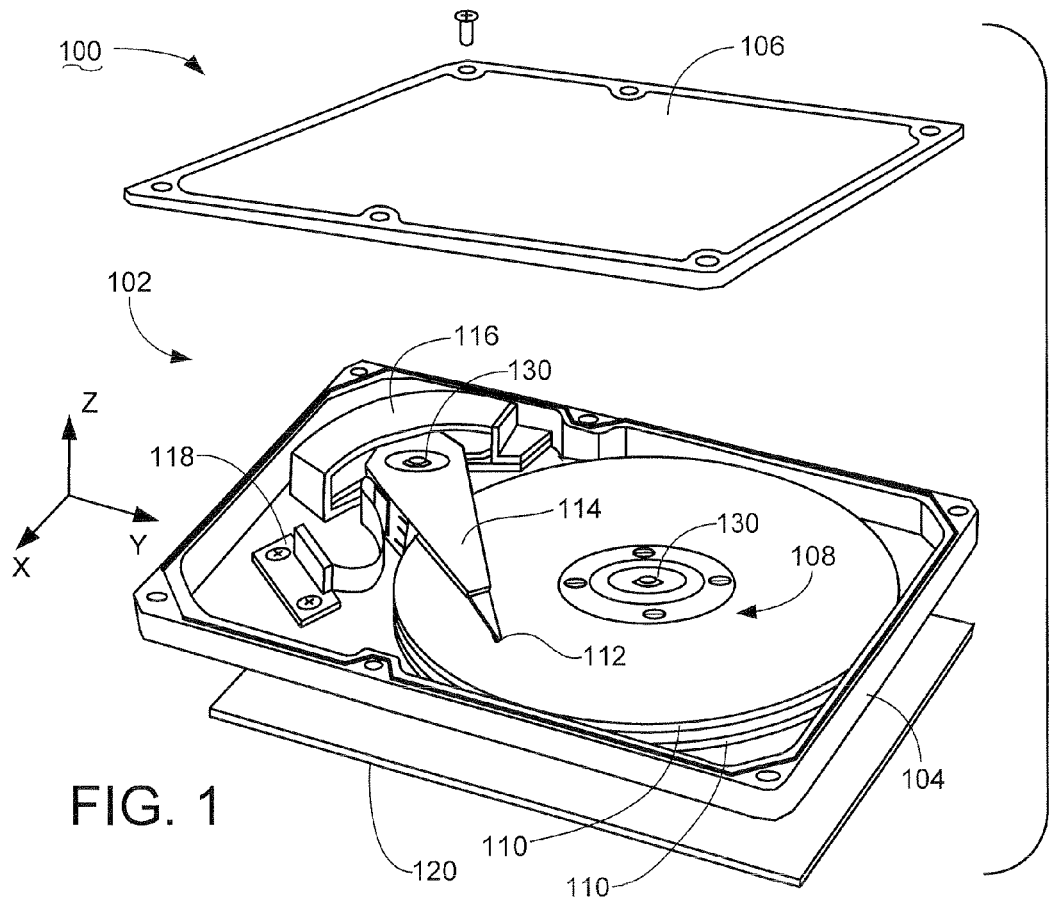
FIG. 1 is an exploded isometric view of a data storage device.

FIG. 1 generally illustrates a data storage device 100 to provide an exemplary environment in which various embodiments of the present invention can be advantageously practiced.

The device 100 includes a housing 102 formed from a base deck 104 and top cover 106. An internally disposed spindle motor 108 rotates a number of storage media 110 in a selected rotational direction. An array of read/write transducers (heads) 112 access data tracks defined on the media surfaces to transfer data between the media 110 and a host device.

An actuator 114 rotates through application of current to a voice coil motor (VCM) 116 to move the transducers 112 across the media surfaces. A flex circuit assembly 118 provides electrical communication paths between the actuator 114 and a device printed circuit board (PCB) 120.

It is contemplated that the device housing 102 is configured to be hermetically sealed to retain a low density atmosphere, such as an inert gas (e.g., helium). The low density atmosphere is provided at a desired pressure that may be higher, the same, or lower than a standard air atmospheric pressure. In other embodiments, however, the internal environment is filled with an air atmosphere, in which case the housing 102 can be hermetically sealed as before, or can include the use of one or more breather paths (not shown) to equalize interior and exterior atmospheric pressures.

Figure 2:
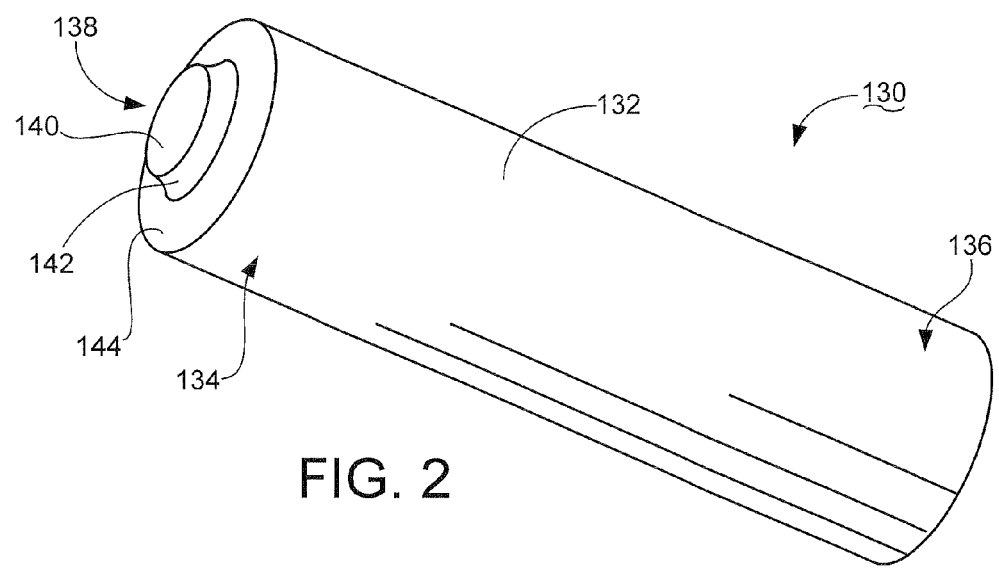
FIG. 2 is an isometric representation of an exemplary shaft 130 of the device of FIG. 1.

FIG. 2 provides an isometric depiction of an exemplary shaft 130 of the device 100. The shaft 130 is internally supported by the housing 102 to facilitate the rotation of a rotatable member about a medial portion thereof, such as the actuator 114 (FIG. 1) or a hub of the spindle motor 108 (FIG. 1).

The exemplary shaft 130 includes a cylindrical main body portion 132 with opposing first and second ends 134, 136. The first end 134 has a stub shaft projection 138 extending therefrom. The stub shaft projection 138 has a facing surface 140 and annular beveled surface 142. The beveled surface 142 extends between the facing surface 140 and an annular base surface 144.

Although not explicitly depicted in FIG. 2, a similar stub shaft projection can be provided to the second end 136 as well. The shaft 130 is internally supported in a stationary relation by housing 102, with the first end 134 engaging the top cover 106 and the second end 136 engaging the base deck 104.

As explained below, the shaft 130 interfaces with the associated housing members 104, 106 in such a way as to accommodate relatively higher levels of compression (e.g., higher mechanical compliance) in a direction along a central axis of the shaft 130; that is, the so-called "z-axis" as depicted in FIG. 1. At the same time, the shaft 130 retains substantial stiffness (e.g., lower mechanical compliance) in a plane normal to the central axis, that is, an "xy plane" formed by orthogonally aligned x and y-axes, as depicted in FIG. 1.

This arrangement accommodates a wide variety of manufacturing tolerances while retaining the requisite xy stiffness for the associated rotational component(s) that rotate about the shaft. This arrangement further impedes the transmission of vibrations from the shaft 130 to the housing 102, and reduces the generation of undesired acoustic noise during operation.

The internal support interface further eliminates the need for an exterior fastener to extend through an aperture in the associated housing member to rigidly secure the shaft 130. This advantageously eliminates a potential leak path through the housing 102, as well as the need to subsequently apply an externally disposed sealing member (e.g., a super seal) to the housing in this vicinity to retain a hermetic seal.

Figure 3:
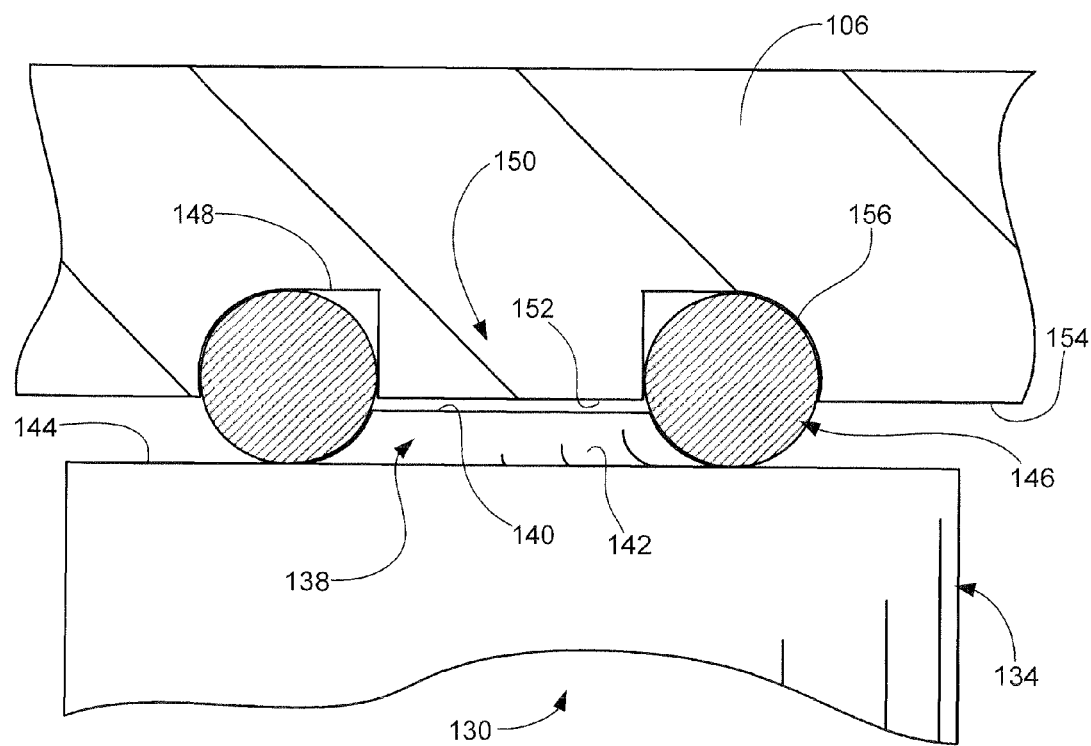
FIG. 3 generally illustrates an exemplary internal support interface in accordance with various embodiments of the present invention.

FIG. 3 is a semi-detailed diagrammatical view of the internal support interface in accordance with some embodiments. As shown in FIG. 3, the first end 134 of the shaft 130 is supported adjacent the top cover 106 using an annular, compressible damping member 146.

A generally ring shaped groove 148, or channel, extends into the top cover 106 to define a central cylindrical portion, or support post 150. The support post 150 includes a facing surface 152 that is placed into adjacent, non-contacting proximity with the facing surface 140 of the stub shaft projection 138 to form a gap therebetween. The facing surface 152 can be at the same elevation as, or at a different elevation from, remaining portions of an interior surface 154 of the top cover 106.

The depth of the groove 148 is determined to receive the greater portion of a compressible damping member 146, which in FIG. 3 is characterized as an elastomeric o-ring. The o-ring is provided with a selected durometer (hardness) and a central opening of internal diameter sized to closely fit over the support post 150. It will be appreciated that the damping member 146 can be provided with other cross-sectional shapes and configurations as desired.

The cross sectional area of the facing surface 152 of the support post 150 is preferably substantially equal to that of the facing surface 140 of the stub shaft projection 138. An outer sidewall surface 156 of the groove 148 is shaped to abut an outermost surface of the damping member 146 to serve as a curvilinear backup shoulder surface therefor. Other cross-sectional shapes for the groove 148 can be readily provided.

During assembly, the damping member 146 is installed onto the support post 150, and the top cover 106 is brought into alignment with the shaft 130. When so positioned, the stub shaft projection 138 is pressed into the central opening of the damping member 146. The damping member 146 is respectively compressed between the respective sidewalls of the groove 148 and post 150, the annular tapered surface 142 of the stub shaft projection 138, and the base surface 144 of the shaft 130. Greater compressibility is generally provided along the z-axis as compared to the xy plane due in part, for example, to the capturing of the stub shaft projection 138 within the central opening of the damping member 146.

Figure 4:
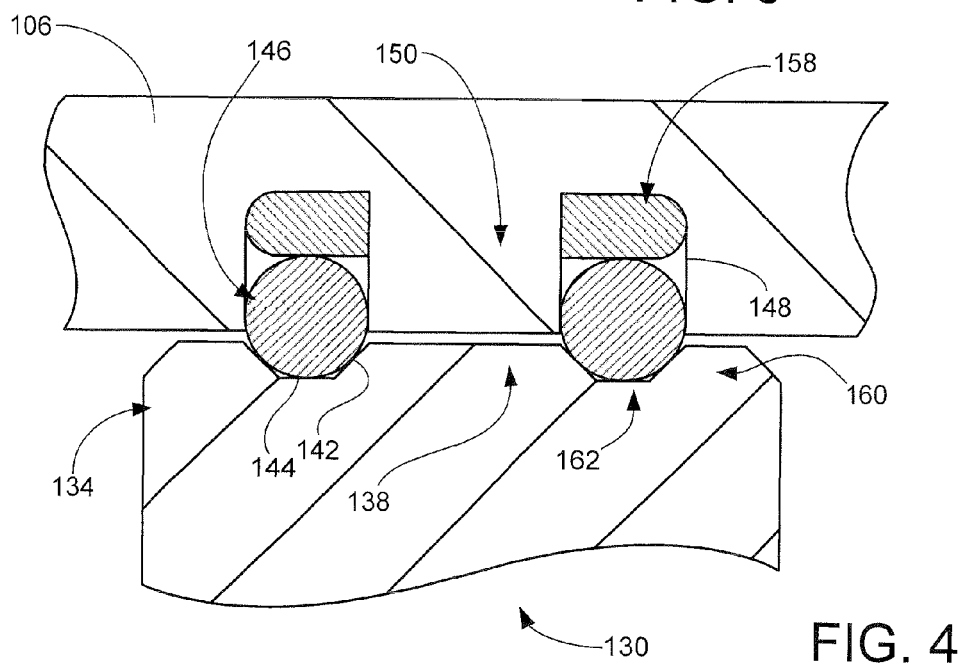
FIG. 4 shows an exemplary internal support interface in accordance with other embodiments.

FIG. 4 shows the internal support interface in accordance with other embodiments. The arrangement of FIG. 4 is generally similar to that of FIG. 3 and so like reference numerals will be used to denote similar components.

The interface of FIG. 4 includes a second damping member 158 disposed within the groove 148 above the first damping member 146. The second damping member 158 is also preferably characterized as an o-ring; in this case an o-ring having a substantially d-shaped cross-section, although other configurations can be used. In this configuration, the second damping member 158 is made from a relatively low durometer (i.e., generally softer) material whereas the first damping member 146 is made from a relatively higher durometer (i.e., generally harder) material.

This advantageously provides the ability to more accurately tune the compressibility of the damping members; for example, depending upon the insertion forces encountered, the second damping member 158 will be deformed to a greater extent than the first damping member 146, enhancing z-axis compression while retaining xy rigidity for the shaft 130.

As desired, an annular retention barrier 160 can be provisioned at the first end 134 of the shaft 130 to surround the stub shaft projection 138 and form a relatively shallow groove 162 to receivingly engage the first damping member 146. The retention barrier 160 further enhances the sheer force, thereby increasing the stiffness of the shaft support.

Figure 5:
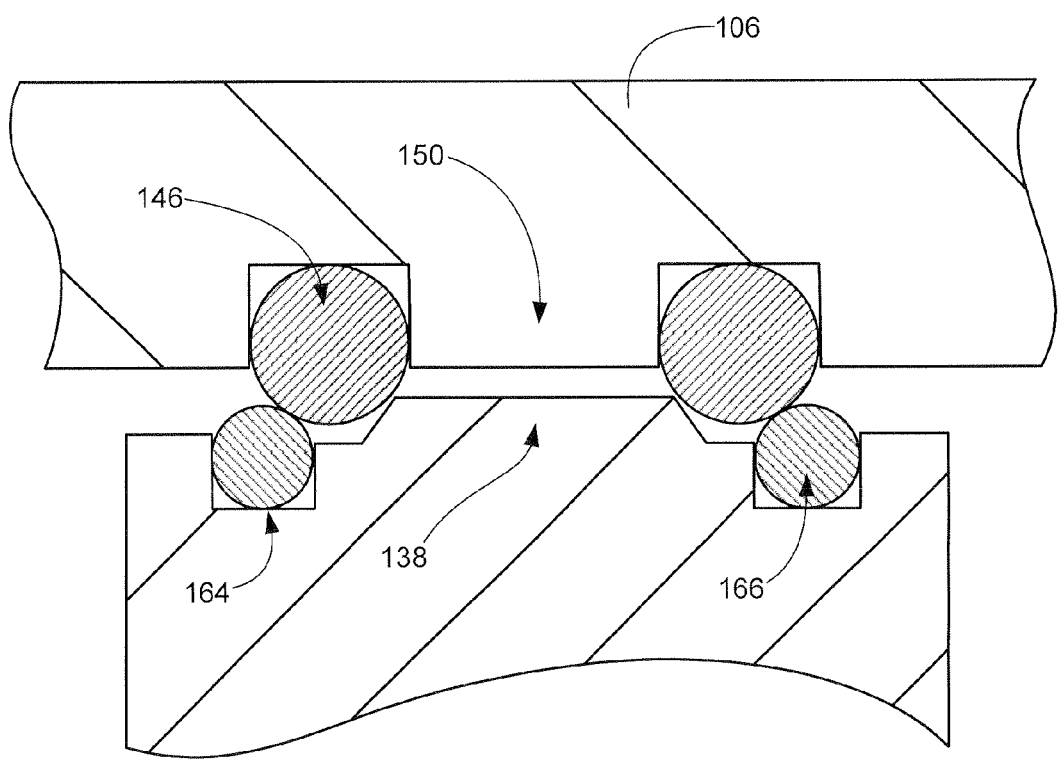
FIG. 5 shows an exemplary internal support interface in accordance with still further embodiments.

FIG. 5 shows the internal support interface in accordance with still further embodiments. As before, like reference numerals are used to denote similar components previously discussed. The configuration of the associated housing member (top cover 106) is substantially similar to that previously set forth in FIG. 3.

In FIG. 5, an additional annular groove 164 is formed into the first end 134 of the shaft 130 to surround the centrally disposed stub shaft projection 138. A second damping member 166 is disposed within the groove 164 to contactingly engage the first damping member 146.

As before, the second damping member 166 is characterized as an o-ring with a relatively low durometer as compared to the durometer of the first damping member 146. This generally provides enhanced compressibility along the z-axis while retaining higher levels of structural rigidity in the xy plane.

Figure 6:
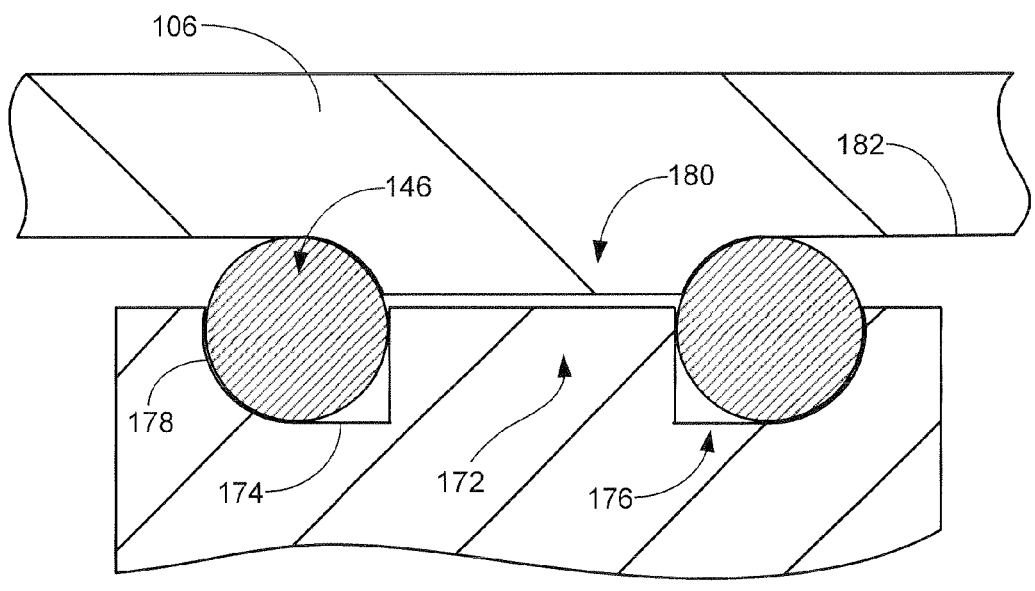
FIG. 6 provides an exemplary internal support interface in accordance with additional embodiments.

FIG. 6 illustrates yet another internal support interface in accordance with selected embodiments. The arrangement of FIG. 6 is generally mirrored with respect to the arrangement of FIG. 3, but otherwise substantially operates as set forth above. For clarity, FIG. 6 generally provides a shaft 170 with a stub shaft projection 172 surrounded by an annular base surface 174.

The surface 174 forms an annular groove 176 in which the damping member 146 is disposed, with outer sidewall 178 of the groove 176 in facing relation to the stub shaft projection 172 to compressingly engage the damping member 146, as before. The housing member (top cover 106) includes a support post 180 extending from annular interior surface 182. Also as before, the support post 180 is in adjacent, non-contacting proximity to the stub shaft projection 172 to form a gap therebetween. The respective arrangements of FIGS. 4 and 5 can be similarly mirrored as desired.

For each of the foregoing embodiments, the material, thickness, durometer and capture features can all be tuned and optimized to create the requisite clamping force while providing vibration and acoustic suppression. The disclosed designs provide a great deal of flexibility to accommodate a wide range of applications.

Various configurations provide compliance in specific directions while providing a very solid interface in others. This can be of particular use in hermetically sealed environments due to pressure variations that may arise due to temperature changes or other effects that can alter mechanical clearances within the device.

The various embodiments presented herein are also relatively inexpensive and easy to manufacture in a high volume manufacturing environment, and are particularly adapted for use in top down automated assembly processes. Part counts can be significantly reduced as compared to prior art interfaces, and overall manufacturing tolerances can be significantly relaxed.

The respective housing and shaft features can be readily generated using suitable materials (metal, plastics, etc.) and manufacturing processes (machining, molding, etc.). While any number of materials can be used for the damping members, including members created using form-in-place techniques, it is contemplated that inexpensive elastomeric o-rings are commercially available in sufficient shapes, sizes, material compositions and properties to meet the requirements of many applications.

For purposes of the appended claims, the recited "first means" will be understood to correspond to the respective configurations of FIGS. 3-6. The use of a separate fastener that extends through an aperture in the housing member from the exterior to the interior to secure the shaft, as in the prior art, is expressly excluded from the scope of an equivalent.

While the various embodiments presented herein are generally provided in the context of a data storage device, it will be appreciated that this is merely for purposes of illustration and is not limiting. Rather, the exemplary internal support interfaces as disclosed herein can be readily used in any number of other environments as desired.

It will be clear that the various embodiments presented herein are well adapted to carry out the objects and attain the ends and advantages mentioned as well as those inherent therein. While presently preferred embodiments have been described for purposes of this disclosure, numerous changes may be made that will readily suggest themselves to those skilled in the art and that are encompassed in the spirit of the invention disclosed and as defined in the appended claims.

What is claimed is:

1. An internal support interface comprising:
   a stationary shaft comprising a medial portion about which a rotatable member rotates, and an end portion comprising an annular base surface surrounding a stub shaft projection;
   a substantially planar housing member comprising a support post extending from an interior surface, the support post in adjacent, non-contacting proximity to the stub shaft projection to form a gap therebetween; and
   an annular damping member which mutually contactingly surrounds the stub shaft projection and the support post while being compressed between the base surface of the shaft and the interior surface of the housing member.

2. The interface of claim 1, wherein the interior surface of the housing member forms an annular groove which surrounds the support post, wherein the annular damping member is disposed within the annular groove, and wherein the annular groove further comprises an outer sidewall in facing relation to the support post against which the damping member is contactingly compressed.

3. The interface of claim 2, wherein the selected end of the shaft further comprises an annular support barrier which surrounds the stub shaft projection to form a second annular groove therebetween, and wherein the damping member is further contactingly compressed against said second annular groove.

4. The interface of claim 1, wherein the annular base surface forms an annular groove which surrounds the stub shaft projection, wherein the annular damping member is disposed within the annular groove, and wherein the annular groove further comprises an outer sidewall in facing relation to the stub shaft projection against which the damping member is contactingly compressed.

5. The interface of claim 1, wherein the damping member is characterized as an elastomeric o-ring with a central aperture into which the stub shaft projection and the support post respectively extend from opposing directions thereof.

6. The interface of claim 1, wherein the stub shaft projection comprises a substantially planar first facing surface surrounded by a tapered surface that extends from the first facing surface to the base surface.

7. The interface of claim 6, wherein the support post comprises a substantially planar second facing surface surrounded by a sidewall surface that extends from the second facing surface to the interior surface, and wherein the first and second facing surfaces are nominally equal in areal extent.

8. The interface of claim 1, wherein the damping member is characterized as a first damping member, and wherein the interface further comprises a second damping member compressed by the first damping member, the second damping member having a durometer lower than a durometer of the first damping member.

9. The interface of claim 8, wherein the second damping member is disposed between the first damping member and the interior surface of the housing member.

10. The interface of claim 8, wherein the second damping member is disposed between the first damping member and the base surface of the shaft.

11. The interface of claim 1, wherein the end portion of the stationary shaft is characterized as a first end, wherein the stationary shaft comprises a second end opposite the first end comprising a second annular base surface surrounding a second stub shaft projection, and wherein the interface further comprises:
   a second substantially planar housing member comprising a second support post extending from a second annular interior surface, the second support post in adjacent, non-contacting proximity to the second stub shaft projection to form a second gap therebetween; and
   a second annular damping member which mutually contactingly surrounds the second stub shaft projection and the second support post while being compressed between the second base surface of the shaft and the second interior surface of the housing member.

12. The interface of claim 1, wherein the planar housing member forms a portion of a housing of a data storage device.

13. The interface of claim 12, wherein the rotatable member comprises a hub of a spindle motor which rotatably supports a rotatable storage medium.

14. The interface of claim 12, wherein the rotatable member comprises an actuator which supports a transducer adjacent a storage medium.

15. The interface of claim 12, wherein the housing is hermetically sealed to retain an inert gas atmosphere.

16. An internal support interface comprising:
   a stationary shaft configured to support a rotatable member for rotation about a central axis; and
   first means for supporting a selected end of the shaft with respect to a housing member to provide relatively higher mechanical compliance in a direction along the central axis and relatively lower mechanical compliance in a direction along a plane normal to the central axis, wherein the first means comprises an annular damping member which mutually contactingly surrounds a stub shaft projection of the shaft and a support post extending from the housing member while being compressed between a base surface of the shaft and an interior surface of the housing member.

17. The interface of claim 16, wherein the damping member is characterized as a first damping member, and wherein the first means further comprises a second damping member compressed by the first damping member, the second damping member having a durometer lower than a durometer of the first damping member.

18. The interface of claim 16, wherein the damping member is characterized as an elastomeric o-ring with a central aperture into which the stub shaft projection and the support post respectively extend from opposing directions thereof.

19. The interface of claim 16, wherein the stub shaft projection comprises a substantially planar first facing surface surrounded by a tapered surface that extends from the first facing surface to the base surface, wherein the support post comprises a substantially planar second facing surface surrounded by a sidewall surface that extends from the second facing surface to the interior surface, and wherein the first and second facing surfaces are nominally equal in areal extent.

* * * * *